Jan. 6, 1942.                R. M. ROWELL                2,269,227
              SHORT RANGE ELECTRICAL MEASURING APPARATUS
                          Filed July 6, 1940
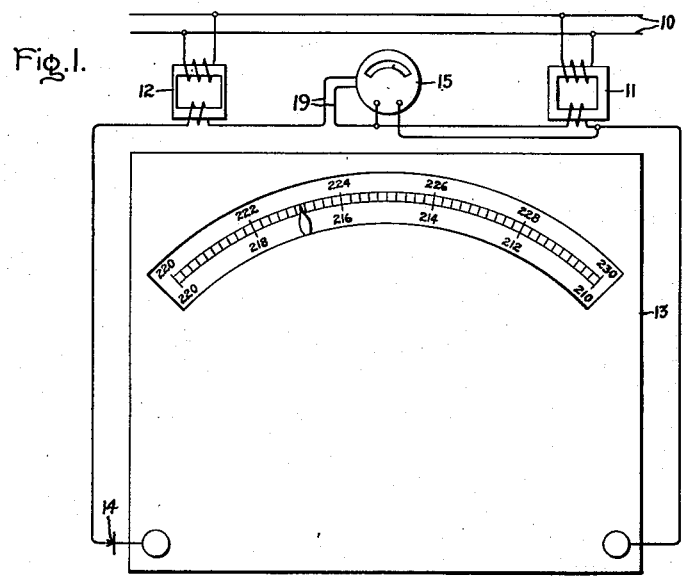
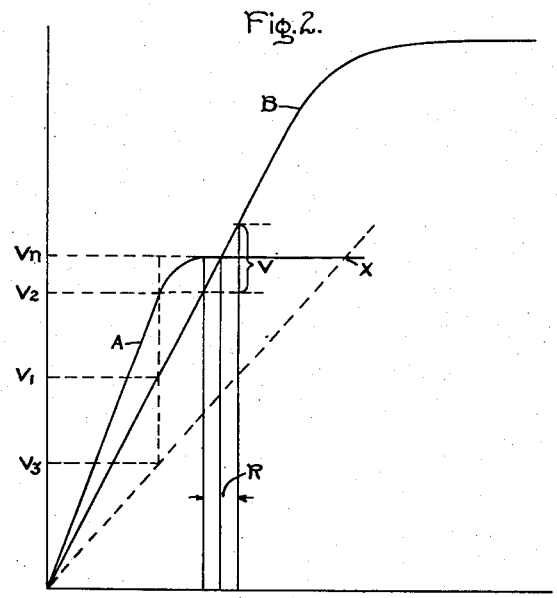
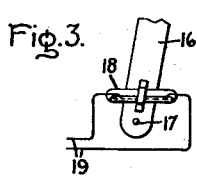
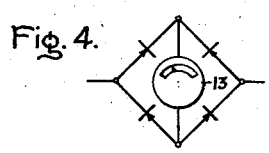
Inventor:
Ralph M. Rowell,
by Harry E. Dunham
His Attorney.

Patented Jan. 6, 1942

2,269,227

UNITED STATES PATENT OFFICE 2,269,227

SHORT RANGE ELECTRICAL MEASURING APPARATUS

Ralph M. Rowell, Lynn, Mass., assignor to General Electric Company, a corporation of New York Application July 6, 1940, Serial No. 344,283

6 Claims. (Cl. 171—95)

My invention relates to short range electrical measuring instruments and circuits therefor. Let us assume, for example, that it is desirable to measure the voltage variation of a 110 volt alternating circuit where such variation is between 110 and 115 volts. By short range, I mean an instrument arrangement which when connected to measure the voltage variation of such circuit may give a zero deflection at 110 volts and has a normal length scale calibrated from 110 to 115 volts, such that the scale corresponds to the variation in voltage rather than to the total voltage whereby great accuracy in the reading is obtained.

In carrying my invention into effect, I provide an instrument of such sensitivity as to measure the variation. In the example given above I might provide a direct current voltmeter, 5 volts across which would give a full scale deflection. This instrument is then connected to the 110 volt circuit in series with a rectifier and a constant 110 volt bucking voltage. Both voltages are obtained from the same source which is helpful in protecting the instrument against excessive voltages.

The features of my invention which are believed to be novel and patentable will be pointed out in the claims appended hereto. For a better understanding of my invention, reference is made in the following description to the accompanying drawing in which Fig. 1 represents my invention as used for the measurement of A.-C. voltage variations; Fig. 2 represents transformer saturation relations to be explained; Fig. 3 shows a detail of a voltage relay used for protecting the measuring instrument under certain conditions, and Fig. 4 represents a full wave rectifier that may be used in Fig. 1.

Referring now to Fig. 1, 10 represents an alternating current circuit on which it is desired to measure the voltage variation assumed to be 5% above and below normal. If the voltage is measured by an ordinary A.-C. voltmeter having a 90 degree scale, the 10% voltage variation would produce a change in deflection of the order of 8 or 10 degrees on the scale at the most. According to my invention the 10% change in voltage may produce a change in deflection on a 90 degree scale instrument up to the equivalent of 180 degrees. That is, I may use the entire scale range twice, if desired, without any change in connections.

In Fig. 1, 11 represents an ordinary instrument potential transformer having a ratio depending on the voltage of line 10. For example, if line 10 is a 2200 volt line, the transformer 11 may have a ratio of 20 to 1 so as to produce normally a secondary voltage of 110 volts. 12 is a device energized from line 10 for producing a substantially constant voltage which may be equal to the normal voltage at the secondary of transformer 11. For example, 110 volts. For this purpose I may use a transformer at 12 having a core with a restricted section or sections designed to become saturated when the transformer is energized from line 10 and producing 110 volts at the secondary, regardless of the 10% variation in primary voltage.

The secondaries of the two transformers are connected in series in bucking or phase opposition relation in the instrument circuit and the instrument 13, except for its scale, is an ordinary sensitive low voltage D.-C. instrument energized through a rectifier 14. When the voltage on line 10 is normal, there will be zero voltage across the instrument and its rectifier, and it will read zero, which point may be marked 220. To distinguish between a zero reading caused by zero line voltage and a zero reading corresponding to normal line voltage, an ordinary A.-C. voltmeter 15 or its equivalent may be connected across the secondary of the transformers 11. When the voltage of line 10 is 5% above normal, an A.-C. voltage of 5.5 volts appears across the instrument and its rectifier and this will produce a corresponding D.-C. voltage across the instrument, causing it to read full scale or nearly full scale and the corresponding indication is marked 231. The remainder of the scale will be calibrated accordingly. The upper scale markings in Fig. 1 represent those above specified.

In the above mentioned condition, the voltage of transformer 11 which is in excess of the voltage of transformer 12 is rectified and measured. However, a voltage will appear across the instrument when the line voltage goes below normal and in such a case it will correspond to the secondary voltage of transformer 12 minus the secondary voltage of transformer 11. The rectified voltage current obviously passes through the instrument 13 in the same direction as before and produces identically the same deflection per volt as before. However, to simplify reading of the instrument, a second scale graduation shown as the lower scale markings is preferably provided, giving the voltage to 5% below normal. To distinguish between voltages above and below normal, again use may be made of the A.-C. voltmeter 15 or some equivalent device which will indicate that the voltage of transformer 11 is higher or lower than that of transformer 12. It is seen that with this arrangement the voltage on line 10 may be easily read to four places. Thus instrument 13 reads 2231 volts. It is, of course, assumed that the instrument has been accurately calibrated with its circuit connections.

I prefer to use a saturated core transformer at 12 which has a sharp knee in its saturation curve and operate it above saturation as close to the knee as possible and still obtain substantially constant voltage at its secondary over the measurement range contemplated. By so doing there is little danger of ever subjecting the instrument 13 to an excessive voltage. For example, in Fig. 2, let A represent the saturation curve for transformer 12, B the saturation curve of transformer 11 and V$n$ the secondary voltage of both transformers when they are equal. The distance R may then correspond to the voltage variation on line 10 over the contemplated measurement range and V the corresponding variation in the secondary voltage of transformer 11. The relation between R and V will, of course, depend upon the transformer ratio of transformer 11 operated below saturation where its transformation ratio remains constant. Certain magnetic nickel iron alloys have characteristics which give sharp knee saturation curves and may be used in the core of transformer 12.

By using the saturated core transformer close to the knee of its saturation curve, it is seen that at abnormally low voltages that may sometimes occur, there is less danger of subjecting the instrument 13 to abnormally high voltages. For instance, in the example given when the secondary voltage of transformer 11 is V$_1$, that of the secondary of transformer 12 is V$_2$. V$_2$—V$_1$ is perhaps three times the full scale voltage of instrument 13 and if not maintained for a long time, will do no damage. It is the maximum that can occur due to a low voltage line condition. However, if we used the transformer 12 at a saturation corresponding to point X on curve A, such that the dotted line through X would correspond to curve B, the voltage on instrument 13 could rise to V$_2$—V$_3$, which is about six times normal full voltage for instrument 13.

It is, of course, possible to otherwise protect the instrument 13 against such low as well as against abnormally high voltage conditions existing on line 10 and one way of doing this is to have the voltmeter 15 serve as a relay to open the circuit of instrument 13 except when the voltage is within the contemplated measurement range. This feature is represented in Fig. 3 where 17 represents the pivot and 16 the pointer of voltmeter 15 when the pointer 16 is in a position corresponding to normal voltage. Attached to the pointer is a small mercury switch 18 which in the position shown closes the circuit therethrough through the leads 19. These leads are in the circuit of instrument 13 as represented in Fig. 1. It is evident that with such an arrangement a small deflection of pointer 16 up-scale or down-scale will open the circuit of instrument 13 and thus protect it against abnormal voltage conditions beyond its measurement range. These are refinements that are not essential to the high accuracy use of the short range instrument but may be desirable in some instances. The rectifier shown at 14 may, of course, be a full wave rectifier such as represented in Fig. 4. It will be apparent from a close inspection of Fig. 2 that it is not essential that the useful range of the curve A be strictly horizontal or that the secondary voltage of the transformer 12 remain strictly constant. Rather, the requirement is that over the useful range at and near the crossing point of the two saturation curves, the transformation ratio of the two transformers be different and remain the same over such range. The secondary voltage of transformer 12 should remain relatively constant as compared to that of transformer 11 for voltage variations over the measurement range.

It will be evident that the short range measurement scheme herein described has the advantage of high accuracy in measuring small voltage changes on circuits of much higher voltages than is impressed on the measuring instrument by reason of using a relatively constant bucking voltage from the same circuit. This advantage does not depend upon the instrument having two scales since the entire voltage variation contemplated may be measured on one scale with the two transformer secondary voltages equal at either the upper or lower end of the voltage variation range. For example, in the device of Fig. 1, it may be assumed that 110 volts at the secondary of transformer 11 is either the upper or lower range of voltage variation, or I could make the secondary voltages equal for the 5% low voltage line condition and then use a 12 volt instrument at 13 so that it would have approximately a full scale deflection for the 5% high voltage condition.

What I claim as new and desire to secure by Letters Patent of the United States is:

1. Electrical measuring apparatus for measuring electrical phenomena of alternating current circuits comprising a direct current type of electrical measuring instrument, rectifier means, a circuit including said rectifier means for energizing said instrument, and means for energizing said circuit by alternating current which varies in accordance with the phenomenon to be measured and also by an opposing alternating current of substantially constant magnitude whereby said instrument is energized by a direct current proportional to the difference between said alternating currents which flows through the instrument in the same direction regardless of which of said alternating current is the larger, said two alternating currents being made equal at one point in the measurement range of said apparatus.

2. Means for measuring variations in voltage of an alternating current source comprising a direct current electrical measuring instrument, a rectifier, circuit connections for energizing said instrument through said rectifier in accordance with the voltage of such source, and means for introducing into said circuit connections an alternating voltage of substantially constant magnitude and in phase opposition to the voltage to be measured whereby said instrument is energized by direct current proportional to the difference in said alternating voltages, said instrument having two coextensive sets of scale calibrations, one for indicating the voltage measurement when the unknown voltage predominates and the other for indicating the voltage measurement when the substantially constant voltage predominates.

3. Apparatus for measuring the voltage variations of an alternating current circuit comprising in combination with such a circuit, a direct current instrument, rectifier means, connections for energizing said instrument through said rectifier means in accordance with the voltage of said circuit, and a saturated core transformer having a primary winding connected to said circuit and a secondary winding connected to introduce its voltage into said instrument energizing connections in opposition to the first mentioned voltage therein, said saturated core transformer voltage reducing the energization of said instrument to zero when the voltage of said circuit is normal, whereby the instrument is energized in accordance with the plus and minus variations as distinguished from the total voltage of said circuit, said saturated core transformer having a relatively sharp saturation characteristic and being operated above and near the saturation point.

4. Apparatus for measuring normal voltage variations of an alternating current circuit comprising in combination with such a circuit a direct current instrument, rectifier apparatus, a pair of transformers for energizing said instrument through said rectifier apparatus from said circuit, one transformer producing a voltage which varies with that of the circuit and the other transformer producing a substantially constant voltage when the voltage of said circuit is within its normal variation range, said two transformer voltages being equal when the voltage of said circuit is at some average normal value, connections whereby the instrument is energized in response to the rectified difference between said transformer voltages, said instrument having two coextensive scales graduated directly in terms of the circuit voltage variations to be measured, one scale for use when such voltage is above and the other scale for use when such voltage is below such average normal value, and means responsive to abnormal voltages on said circuit for deenergizing said instrument.

5. In a measuring system, a circuit containing a rectifier instrument consisting of a direct current measuring instrument and rectifier apparatus, means for introducing into said circuit an alternating current voltage, the value of which varies in response to a value to be measured, means for introducing into said circuit a substantially constant, alternating current voltage in bucking relation to the variable voltage and of such magnitude that the resultant voltage impressed upon said rectifier instrument passes through a zero value over the measurement range, said instrument having an indicating scale plate on which are two sets of calibrations, one set corresponding to the variable to be measured when the variable alternative current voltage is greater than the bucking voltage and the other set corresponding to the variable to be measured when the variable alternating current voltage is less than the bucking voltage.

6. In an electrical measuring circuit, a rectifier instrument consisting of a direct current indicating instrument and rectifier apparatus, means responsive to a variable to be measured for introducing into said circuit an alternating current voltage which varies in value in response to a variable to be measured, and means for introducing into said circuit a substantially constant alternating current voltage in bucking relation to the variable voltage and of such value that the resultant voltage across said rectifier instrument is zero at an intermediate point in the measurement range and increases from zero for two different parts of the measurement range, said indicating instrument having a scale plate carrying two sets of calibrations corresponding to the two different parts of such measurement range.

RALPH M. ROWELL.